UNITED STATES PATENT OFFICE.

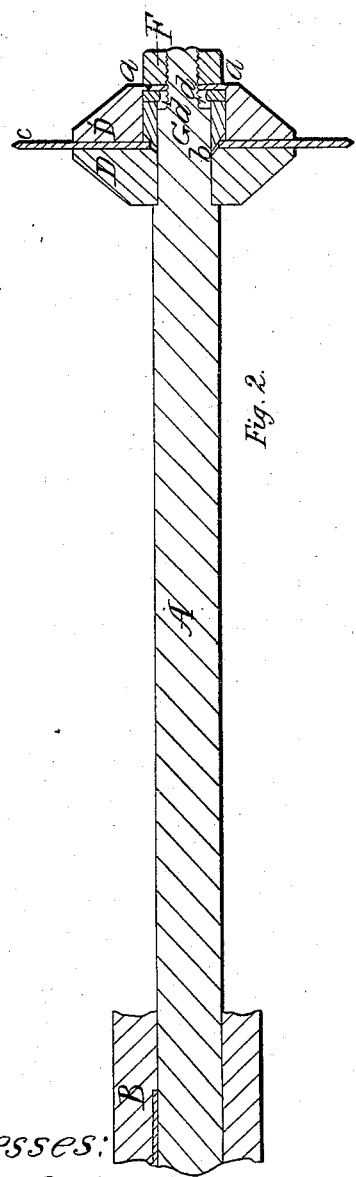
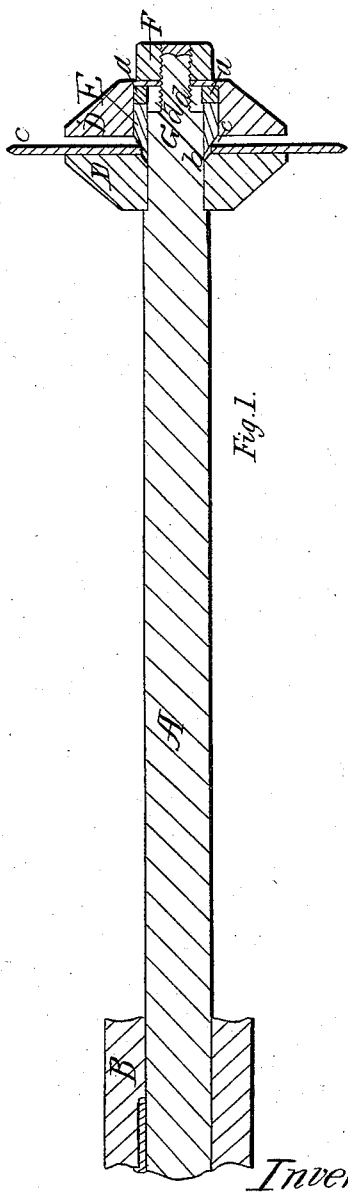

ALBERT L. RICE, OF WORCESTER, MASSACHUSETTS.

IMPROVEMENT IN MODE OF ATTACHING CIRCULAR SAWS TO THEIR ARBORS.

Specification forming part of Letters Patent No. 54,774, dated May 15, 1866.

*To all whom it may concern:*

Be it known that I, A. L. RICE, of the city and county of Worcester, and State of Massachusetts, have invented certain new and useful Improvements in the Mode of Adjusting and Attaching Circular Saws to their Arbors; and I do hereby declare that the following is a full, clear, and exact description of the same, reference being had to the accompanying drawings, forming a part of this specification, in which—

Figure 1 represents a longitudinal central section of a saw-arbor, together with a central section of the saw or cutter, and the devices for adjusting and securing the same to the arbor, and Fig. 2 represents a similar view or section when the parts are secured firmly into place.

In the drawings, A represents the arbor for the saw or cutter; B, the pulley; C, the saw or cutter; D D', the collars which hold the saw or cutter; E, the conical adjusting collar or center; a, the rubber or elastic packing, and F the nut by which the several parts are held in place.

This invention obviates the greatest difficulty in the use of saws of different sizes upon the same arbor.

Many different plans have been resorted to in order to permit a saw or cutter to be adjusted and secured upon an arbor smaller than the hole in the saw or cutter. This is accomplished by my invention in an expeditious, simple, and secure manner.

Collar D is fitted to the end of the arbor, as shown in the drawings, and is concaved out, as seen at *b*.

Saw C, the hole in which is much larger than the arbor upon which it is placed, is properly centered by the adjusting cone or collar E, which is made to fit the end G of the arbor A, its conical end *c* fitting in between the surface of the arbor and the saw, as indicated in the drawings. In this way any saw or cutter can be accurately centered and fitted to the end G of arbor A if the hole is not larger than the conical end *c* of collar E.

In adjusting the saw to its arbor the movable collar D', in which a recess is formed of such depth that the sliding bush E may be contained therein, is forced up against the saw by means of the nut F. While thus moved up the collar in turn presses against the elastic packing or washer *a*, which also fits in the recess in said collar, and by this pressure the conical bush E, sliding on the end of the arbor G, and shaped so as also to fit in the recess in the movable collar D', is made to center and adjust the saw. Thus it will be seen that by means of the nut F the two operations of centering the saw and securing it on its shaft or arbor are effected simultaneously.

In Fig. 1 the saw C is shown properly centered, and nut F placed in position to be screwed up, the elastic packing *a* holding collar E in place. In Fig. 2, nut F is shown screwed up, whereby collar D' is brought up firm in contact with saw or cutter C, which is held firmly between the collars D and D'.

In practice it will be well to slightly concave collars D and D', so that the bite upon the saw or cutter will be near their outer peripheries. When nut F is turned up the rubber or elastic packing *a* yields and is forced into the space *d*. In case a saw is to be used which just fits the end G, then the rubber or elastic packing *a* is removed, thereby allowing the conical collar E to slip back into the collar D'.

The object of concaving out collar D, as seen at *b*, is to give room for the point of E when saws or cutters are used with holes so large that the point of E will pass through the saw.

This invention is applicable to saws or cutters whether used for working wood or iron.

Having described my invention, what I claim therein as new, and desire to secure by Letters Patent, is—

1. The improved mode herein described of attaching and adjusting circular saws to their arbors, by the combination, with the stationary and movable recessed collars, as herein described, of a conical bush sliding on the saw-arbor, and fitting in the recess formed in the movable collar under such an arrangement that the saw may be simultaneously adjusted and secured on its arbor, as shown and set forth.

2. In combination with the stationary and movable collar and conical bush fitting in a recess in the movable collar, as described, the employment of a rubber or other elastic packing or washer, as and for the purposes herein set forth.

ALBERT L. RICE.

Witnesses:
THOS. H. DODGE,
H. L. FULLER.